Oct. 27, 1970     P. R. EKLUND ET AL     3,536,368
METHOD OF JOINING AND FABRICATING HOLLOW
MEMBERS FOR USE IN ROLLING BEARINGS
Filed Aug. 5, 1968

INVENTORS
PHILLIP R. EKLUND
GABE L. CAMPBELL
BY Harry A. Herbert Jr.
ATTORNEY
Arthur R. Parker
AGENT United States Patent Office 3,536,368
Patented Oct. 27, 1970

1

3,536,368
METHOD OF JOINING AND FABRICATING
HOLLOW MEMBERS FOR USE IN ROLLING
BEARINGS
Phillip R. Eklund, 3339 Stanwick Drive 45430, and
Gabe L. Campbell, 2805 Prentice St. 45420, both of
Dayton, Ohio
Filed Aug. 5, 1968, Ser. No. 750,329
Int. Cl. F16c 33/00; B21d 53/10
U.S. Cl. 308—188         2 Claims

ABSTRACT OF THE DISCLOSURE

An improved hollow ball construction for application in a ball bearing, and method of forming the same, in which two hemispheric shell members are uniquely joined together by means of a tongue-and-groove arrangement having increased strength, better resistance to fatigue and improved dynamic stability.

BACKGROUND OF THE INVENTION

This invention relates generally to the field of hollow ball construction and, more specifically, to the formation of a unique ball structure that is of particular applicability in a ball bearing arrangement.

The use of the hollow ball construction technique for application in a ball bearing has previously involved the assembly of two identical, or substantially identical hemispheric shells, each forming one-half of the completed ball structure. Normally, these two half shells are welded together into a butt-type joint. In the formation of such a butt joint, it is considered highly desirable, if not actually required, that a substantially uniform and homogeneous joint be established between the said two hemispheres. In this connection, it is known that, in order to produce a joint of this type that is of a sufficient strength to successfully withstand the forces and stresses inherent in the application of such hollow ball constructions to ball bearing arrangements, the usual methods of joining together such hemispheric or half shells has involved the use of such techniques as the diffusion bonding process, or the fabrication of the hollow ball segments by means of an electron beam or the TIG (tungsten-inert-gas) welding technique. However, these methods have caused the formation of excessive amounts of welding material in the form of bulges, or what is known as "flashes" of material, on both the external and internal surfaces of the completed ball structure adjacent to the welding joint or bonding line of the two hemispheric or half-shells thereof. Although the external flash of material may be rather easily removed during the final machining process, the internal flash of material remains. This internal flash or bulge of material effects a nonuniform distribution of weight so that at relatively high speeds of rotation, uneven and thus dynamically unstable operation occurs. In addition, failure occurs at or near the joint area, even when operation is at a relatively low speeds and loads but for a prolonged period. In this regard, in the diffusion bonding process, the previously described "flash" of material actually is in the form of a whole series of circumferentially-disposed bulges or beads of welding material which are disposed in an upset configuration at the bond line, which results in a plurality of sharply-defined notches which, in effect, have a bulge of material on each side thereof. This configuration both creates an undesirable nonuniform stiffening and results in the introduction of a stress concentration or raiser at the point of each of said notches. In the electron beam technique, or the TIG welding method, an uneven flash of welding material, or in other words, a girth weld is formed at the bonding line which, likewise,

2 suffers the disadvantage of creating a nonuniform stiffening therein, as well as providing a source for a host of stress raisers. Moreover, the microstructure of the weld tends to differ materially from that of the base structure, or in other words, from that of the two hemispheric shells being joined thereby. On the other hand, the unique arrangement of the present invention offers substantial improvement over these previously mentioned fabrication techniques in the specific manner set forth hereinafter in the following summary and detailed description thereof.

SUMMARY OF THE INVENTION

A principal object of the present invention, therefore, resides in an improved method and hollow ball construction in which two hemispheric or half shells comprising the completed ball structure are uniquely joined along nonlinear and interfitting surfaces to thereby provide a more uniform and homogeneous joint therebetween which further offers greater strength reliability and increased resistance to fatigue.

A further object of the invention is in the utilization of a hollow ball structure constructed from two half-shell elements that may be brazed together along a common bonding joint formed between novel and matching tongue-and-groove elements projecting from the open edge surfaces of the half-shell elements and thereby providing a relatively smooth and thus dynamically stable bond.

BRIEF DESCRIPTION OF THE DRAWING

Other objects and advantages of the invention will become apparent from the following disclosure thereof, in which.

DESCRIPTION OF THE PREFERRED
EMBODIMENT

Figure 1:
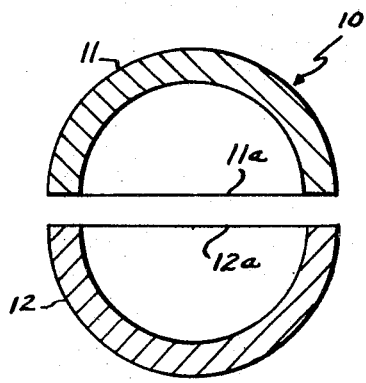
FIG. 1 is a cross-sectional view of the general type of hemispherical shells, shown in their disassembled condition, comprising a completed hollow ball structure, and to which the unique tongue-and-groove arrangement of the present invention may be applied.
Figure 2:
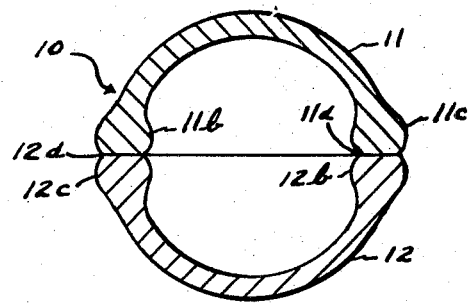
FIG. 2 is a second cross-sectional view of the hemispherical shells of FIG. 1, illustrating the assembled condition thereof when welded together as a single unit, and further showing the uneven flash structure formed on both inner and outer surfaces of the bonding line between the two shells.

Referring to the drawing and, in particular, to FIGS. 1 and 2 thereof, one type of hollow ball construction to which the present invention is directly applicable is illustrated generally at 10 as consisting of a pair of identical hemispheric shells at 11 and 12. In the usual hollow ball construction, shells 11 and 12 are formed with even open edge surfaces, such as is shown respectively at 11a and 12a. In assembling the aforesaid shells 11 and 12 together into a single unit comprising the completed hollow ball structure, the surfaces 11a and 12a are brought together, as seen particularly in FIG. 2, into a butt joint by one of several standard welding methods, such as diffusion bonding. However, although a supposedly uniform and homogeneous joint is formed; in fact, an upset or bulge of excess material is formed at the bond line on both inner and outer surfaces of the joint area between the two hemispheric shells, as is seen for example, at 11b and 11c, and at 12b and 12c, respectively, in FIG. 2. This upset of material is formed with a sharply-defined notch as indicated specifically at 11d and 12d, respectively, which creates both a nonuniform stiffening thereat, as well as introducing a stress concentration. The unique arrangement of the present invention eliminates, or at least substantially eliminates, the foregoing disadvantages in the specific manner to be hereinafter described in detail.

Figure 3:
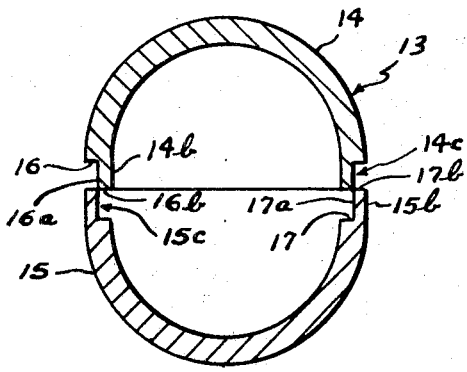
FIG. 3 represents an exploded view, in cross-section, illustrating details of the improved tongue-and-groove arrangement used with the shell elements comprising the hollow ball construction of the present invention, and shown in their disassembled condition.
Figure 4:
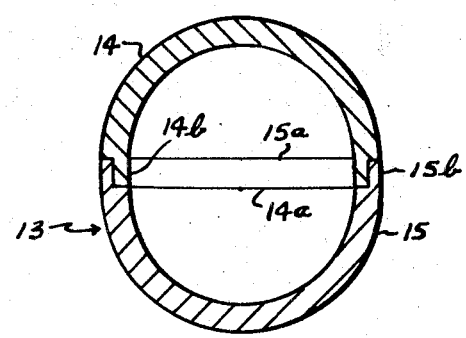
FIG. 4 is another cross-sectional view of the improved hemispheric shell elements of FIG. 3, illustrating the assembled condition thereof.

Referring specifically to FIGS. 3 and 4, the improved hollow ball construction of the present invention is indicated generally at 13 as consisting of a pair of hemispheric shell elements at 14 and 15. Said hemispheric shell elements 14 and 15 are uniquely constructed with their open edge surfaces indicated respectively at 14a and 15a in FIG. 4, integrally formed with a uniquely applied tongue-and-groove arrangement consisting respectively of the tongue-and-groove elements 14b and 14c, and 15b and 15c for the hemispheric shell elements 14 and 15. As seen clearly in FIG. 3, each respective tongue-and-groove element is formed by means of an integral, circumferentially-disposed, protruding edge surface portion which projects outwardly of the open edge surface of each of said pair of hemispheric shell elements 14 and 15 comprising the improved hollow ball construction of the present invention.

The above noted, circumferentially-disposed, protruding edge surface portions, which actually also constitute the previously described tongue elements 14b and 15b, is constructable with a thickness that, in one form, may be made approximately one-half the thickness of the wall of the hemispheric shell element 14 or 15 corresponding thereto. In this manner, the previously described, groove elements 14c and 15c are also formed in circumferential relation and adjacent to the aforesaid tongue elements 14b, 15b formed on, and thus comprising an integral part of the open edge surfaces of the previously described hemispheric shell elements 14, 15. Since the said tongue elements 14b and 15b are formed in opposing relation to each other on their respective hemispheric shell elements 14, 15, a pair of oppositely-disposed, and matching and therefore interfitting tongue-and-groove element arrangements are formed, as clearly illustrated in FIG. 4, to exactly interfit with each other when in their assembled condition.

The above mentioned assembly of the pair of hemispheric shell elements 14 and 15 is accomplished in a new and improved manner, not by welding as described hereinbefore, but by joining together the shell elements 14 and 15 by means of the use of a brazing technique along the line-to-line contact between the bonding and interfitting surfaces respectively indicated at 16, 16a and 16b, for shell element 14, and at 17, 17a and 17b for shell element 15, as is indicated particularly in the novel form of FIG. 4. With the unique tongue-and-groove application described above, it has been determined that a microstructurally uniform bond or joint is attainable with a higher temperature brazing technique performed preferably under vacuum conditions. In this regard, the use of what is known as a nickel-chromium or micro-brazing technique is also facilitated by the utilization of the present tongue-and-groove arrangement, which technique would result in a high strength bond between the hemispheric shells 14 and 15. Moreover, with the application thereto of an appropriate diffusion technique, sufficient hardness and ductility may be imparted to the joint formed between the presently designed hemispheric shells 14 and 15 and therefore throughout the hollow ball uniquely constructed thereby. Furthermore, the present arrangement offers a substantially smooth junction between the two hemispheric shells 14 and 15 of the invention and, in particular, at the inner surfaces thereof to thereby eliminate the previously described, sharply defined notches inherent in other joining methods. Thus, the stress concentrations and/or stress raisers formed at the juncture between two shells in previously developed techniques are eliminated in the improved hollow ball structure of the present invention. Finally, the present structure exhibits the additional advantage of having a more uniform mass weight distribution due to the absence of any internal "flash" or girth weld formed on the inner surfaces of the finished ball product and, accordingly, high speed operation with dynamic stability is assured.

Figure 5:
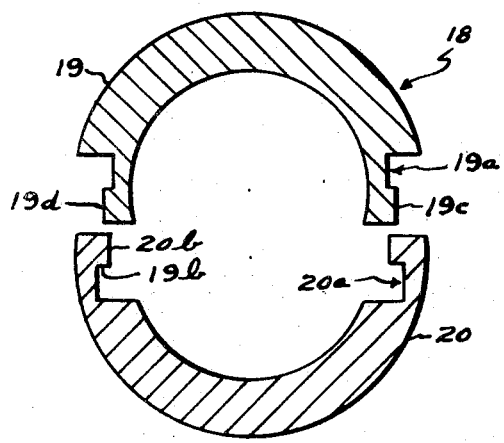
FIG. 5 is another exploded view, in cross-section, of a second form of the inventive hollow ball construction of FIGS. 3 and 4, showing a modified tongue-and-groove interconnection between the hemispheric shell elements thereof.
Figure 6:
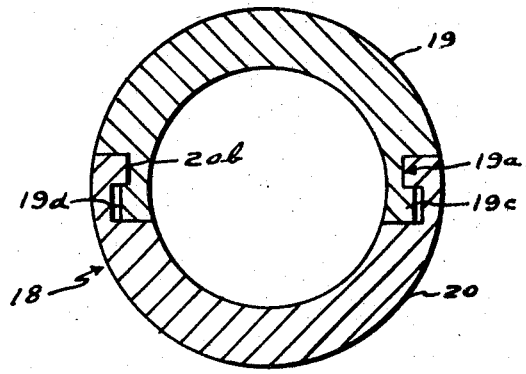
FIG. 6 is another cross-sectional view of the hollow ball construction of FIG. 5, illustrating the assembled condition of the modified tongue-and-groove interconnection between the hemispheric shell elements thereof.

In FIGS. 5 and 6 of the drawing, a modified form of hollow ball construction is depicted generally at 18 as, again, including a pair of hemispheric shell elements at 19 and 20. In this second arrangement of the present invention, hemispheric shell element 20 is shown as being integrally formed with a circumferentially-disposed and inwardly-arranged groove at 20a, which groove 20a is incorporated on the inside circumference thereof at a position inwardly of, and substantially adjacent to, the open end edge surface of shell element 20. With the use of such a groove, located as at 20a, an inwardly-turned and circumferential tongue element is defined at 20b and actually forms the said open end edge surface of the shell element 20, the innermost surface of which may be squared off, as shown, to exactly interfit with a second groove indicated at 19a, which is depicted as being exteriorly disposed and outwardly arranged in circumferential relation within said hemispheric shell 19 at a position that is, again, inwardly of, and substantially adjacent to, the open end edge surface thereof.

The above mentioned hemispheric shell 19 is further integrally formed with a reduced size, outer circumference at the aforesaid open end edge surface thereof, as compared to the main circumference thereof, to thereby provide or define a relatively small, circumferentially-disposed, and outwardly-extending lip portion, as is indicated at 19c. The latter element 19c is designed to engage within the previously described groove 20a of the hemispheric shell element 20, as is depicted in the assembled view of FIG. 6. In this regard, the outermost bonding line or surface 19d of the said lip portion 19c may be disposed within the aforesaid groove 19a with a clearance of approximately 0.001 to 0.003 inch with respect to the inside surface of the said groove. Furthermore, the tongue element 20b of the hemispheric shell element 20 is disposed within groove 19a of the shell element 19 with an overlap of approximately 0.005 to 0.010 inch relative to the outer edge of the aforesaid lip portion 19c. With the use of such a lip portion, as at 19c, added to the previous use of a tongue-and-groove arrangement and with the previously described brazing technique being utilized for bonding the two hemispheric shell elements 19 and 20, again, along a line-to-line contact, as clearly illustrated, a joint is formed therebetween that is both smoother and more homogeneous, and which further incorporates the additional marked advantages of providing in a simplified and yet unique manner an added degree of mechanical restraint further resisting operational loads and stresses.

Thus, a new and improved tongue-and-groove joint means for bonding together hemispheric shell elements of a hollow ball structure has been developed that exhibits greater structural integrity and dynamic stability when used as a ball bearing and which ensures correct alignment between the two elements throughout the bonding process.

Moreover, although the above-described joining and fabricating means has been made with specific reference to the hollow ball bearing member, it is to be understood

We claim:
1. In a process for constructing a hollow rolling bearing structure including a substantially identical pair of shell halves formed into a rolling bearing member, the steps comprising: initially integrally forming each of said shell halves with an open-ended joint edge portion configured to interfit with each other along a series of integrally-formed bonding surfaces nonlinearly arranged with respect to each other and further disposed in precise, complementary and relatively close, interfitting and linear relation relative to the corresponding bonding surfaces arranged between, and integrally formed to, said oppositely-disposed joint edge portions of said shell halves; thereafter joining each of said shell halves to each other along said series of interfitted and linearly-disposed bonding surfaces; and subsequently applying a brazing material under relatively high temperature conditions in the relatively limited space inherently provided between each of the linearly-disposed series of interfitted bonding surfaces while the latter are disposed in a vacuum environment to thereby collectively form a close fitting, stronger and more uniform, homogeneous and therefore dynamically stable joint capable of operating under higher bearing loads and with increased resistance to fatigue between the two shell halves forming the hollow rolling bearing structure, the step of initially forming each of said shell halves with an open-ended joint edge portion further including forming each of said shell halves with a tongue-and-groove arrangement disposed in complementary and relatively close abutting relation to each other, each of said tongue-and-groove arrangements being further formed with at least one circumferentially-arranged tongue joint portion projecting outwardly from a corresponding shell half and being further constructed with a substantially reduced thickness relative to that of the main circumference of said shell half to thereby provide at least one, circumferentially-arranged grooved joint portion on both of said shell halves, said grooved joint portions being thereby disposed in offset relation to each other, and further configured to interfit with the tongue joint portion integrally formed on each of said shell halves, said grooved joint portions being made of a depth slightly greater than the length of said tongue joint portions to thereby provide a predetermined clearance between said tongue-and-groove joint portions and thus ensure an additional built-in mechanical restraint and greater strength in the joint between said shell halves.

2. A hollow rolling bearing structure comprising a pair of substantially identical half shell members joined together into a single unitary rolling bearing construction, each of said half shell members having an open-ended edge joint surface incorporating half shell member-bonding and uniting means integrally formed thereon and projecting outwardly therefrom and being thereby unitable with the other of said half shell members, the said bonding and uniting means comprising oppositely-disposed and mating uniting edge joint surfaces alternately arranged relative to each other along a series of bonding areas nonlinearly-arranged with respect to the bonding surfaces along a particular edge joint surface and further being linearly-arranged and therefore complementarily-disposed in a line-to-line contact with the contacting bonding surfaces of said oppositely-disposed, edge joint surface of the other of said half shell members to thereby facilitate a precisely interfitting union between each of said half shell members along relatively smooth bonding areas formed therebetwen, said bonding-and-uniting means further incorporating brazing material means applied under relatively high temperature and vacuum conditions along and interposed in a relatively thin layer in the relatively restricted spaces inherently formed between the corresponding bonding areas forming the line-to-line contact and relatively smooth contacting areas to thereby form a relatively crevice-free and uncontaminated brazed joint between said half shell members of a uniformity and strength substantially equivalent to that of said pair of half shell members, said bonding and uniting means of each of said half shell members further comprising tongue-and-groove means alternately disposed relative to each other on each of said half shell members and being further integrally formed on the open-ended edge joint surfaces thereof, said tongue-and-grove means of each of said half shell members projecting inwardly in offset relation towards each other to a combined, interfitting and relatively close-abutting relation therebetween, and thus facilitate the application therewithin of the said relatively thin-layer, brazing material means and thereby ensure the uniting of said pair of half shell members together along said series of bonding areas into a substantially homogeneous, relatively smooth and dynamically stable joint exhibiting substantially improved strength and increased resistance to fatigue; said tongue-and-groove means further including a transversing extending lip portion integrally formed on each of said half shell member-bonding and uniting means and being further adapted to project into a similarly-shaped groove formed in substantially matching relation thereto in each half shell member, said transversely-extending lip portion being slightly shorter than sadi groove to thereby provide for even further mechanical restraint and thus further resist any inherent moving forces applied to said half shell members when under bearing loads and thereby ensure a further increase in strength in the joint provided between said half shell members.

References Cited

UNITED STATES PATENTS

| | | | |
|---|---|---|---|
| 1,356,848 | 10/1920 | Bokelund | 308—194 |
| 2,782,862 | 2/1957 | Wright | 308—196 |
| 3,274,666 | 9/1966 | Nordsieck | 29—148.4 |

FOREIGN PATENTS 757,205  10/1933  France.

FRED C. MATTERN, JR., Primary Examiner
F. SUSKO, Assistant Examiner

U.S. Cl. X.R.
29—148.4